United States Patent
Buchta

(10) Patent No.: US 12,176,769 B2
(45) Date of Patent: Dec. 24, 2024

(54) METHOD FOR PRODUCING A POLE CORE, POLE CORE, ELECTROMAGNETIC ACTUATOR AND VIBRATION DAMPER

(71) Applicant: KENDRION (VILLINGEN) GMBH, Villingen-Schwenningen (DE)

(72) Inventor: Aleš Buchta, Kralicena Hane (CZ)

( * ) Notice: Subject to any disclaimer, the term of this patent is extended or adjusted under 35 U.S.C. 154(b) by 223 days.

(21) Appl. No.: 17/909,140

(22) PCT Filed: Mar. 2, 2021

(86) PCT No.: PCT/EP2021/055113
§ 371 (c)(1),
(2) Date: Sep. 2, 2022

(87) PCT Pub. No.: WO2021/175811
PCT Pub. Date: Sep. 10, 2021

(65) Prior Publication Data
US 2023/0148245 A1     May 11, 2023

(30) Foreign Application Priority Data
Mar. 5, 2020   (DE) ................... 10 2020 106 013.0

(51) Int. Cl.
*H02K 15/02*     (2006.01)
*B60G 17/08*     (2006.01)
*H02K 1/08*      (2006.01)

(52) U.S. Cl.
CPC ............. *H02K 15/022* (2013.01); *H02K 1/08* (2013.01); *B60G 17/08* (2013.01); *B60G 2500/10* (2013.01); *B60G 2800/162* (2013.01)

(58) Field of Classification Search
CPC ........ H02K 1/08; H02K 15/022; B60G 17/08; B60G 2500/10; B60G 2800/162
See application file for complete search history.

(56) References Cited

U.S. PATENT DOCUMENTS

| | | | |
|---|---|---|---|
| 2014/0166914 A1* | 6/2014 | Pott | ...... H01F 7/1638 251/129.15 |
| 2014/0202561 A1* | 7/2014 | Bergfeld | ............ F16F 9/34 137/487.5 |

(Continued)

FOREIGN PATENT DOCUMENTS

| | | |
|---|---|---|
| CN | 100434739 C | 11/2008 |
| DE | 4310719 A1 | 10/1994 |

(Continued)

OTHER PUBLICATIONS

Office Action issued in corresponding German application No. 102020106013.0.

*Primary Examiner* — Jue Zhang
(74) *Attorney, Agent, or Firm* — Nath, Goldberg & Meyer; Jerald L. Meyer; Tanya E. Harkins

(57) ABSTRACT

A pole core (1) is constructed by providing a magnetic workpiece (10), in which a first side (11) has a groove (15) directed toward a second side (12). Plural inserts (20) and bonding means (25) are inserted into the groove (15), with the bonding means (25) arranged between the inserts, and integrally bonding the inserts (20) to each other and/or to the workpiece (10). The pole core (1) may be used as in an electromagnetic actuator in a vibration damper for a vehicle, in which, if the electromagnetic actuator fails, the motor vehicle can be operated safely with the vibration damper.

14 Claims, 1 Drawing Sheet

(56) References Cited

U.S. PATENT DOCUMENTS

Figure 1:
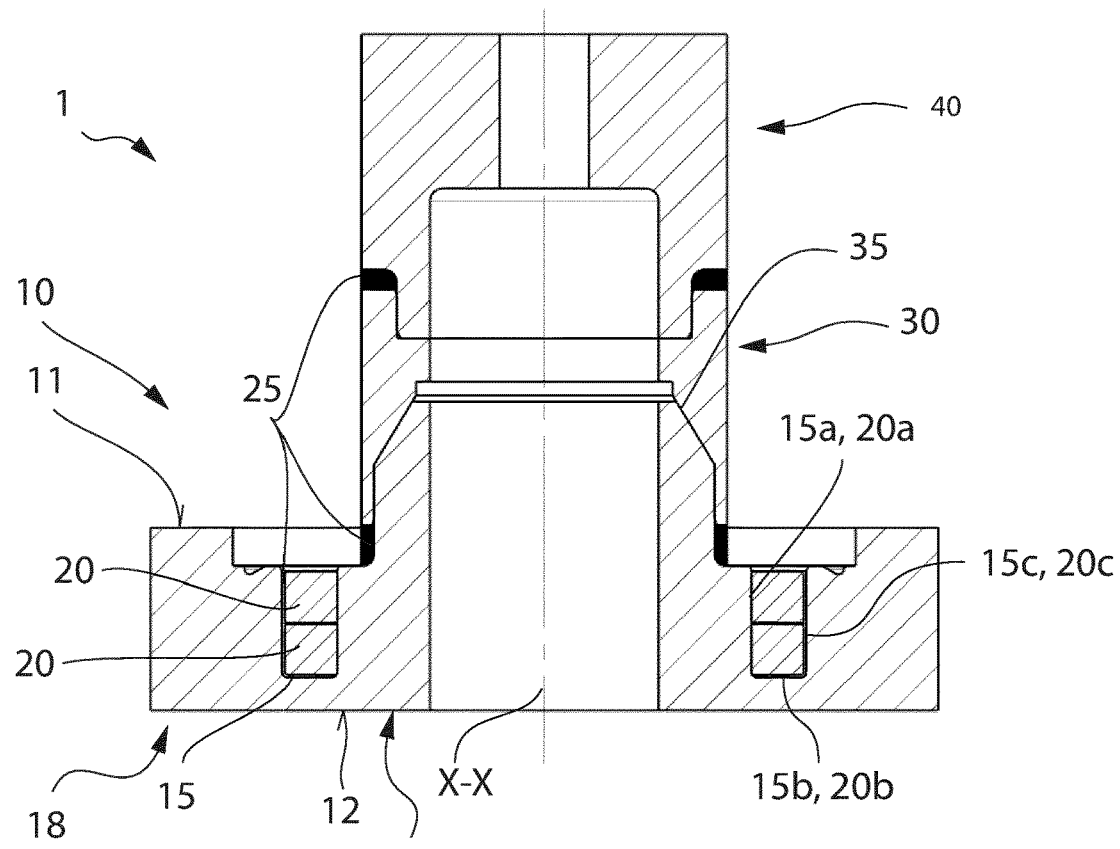

| | | | | |
|---|---|---|---|---|
| 2014/0217316 | A1* | 8/2014 | Zelano | F02M 59/368 |
| | | | | 251/129.01 |
| 2016/0109034 | A1* | 4/2016 | Flühs | F16K 31/0648 |
| | | | | 251/129.15 |

FOREIGN PATENT DOCUMENTS

| | | |
|---|---|---|
| DE | 102005061951 A1 | 7/2006 |
| JP | 57127128 A | 8/1982 |
| JP | 58002021 A | 1/1983 |
| JP | 2017227268 A | 12/2017 |

* cited by examiner

METHOD FOR PRODUCING A POLE CORE, POLE CORE, ELECTROMAGNETIC ACTUATOR AND VIBRATION DAMPER

This is a National Phase Application filed under 35 U.S.C. 371 as a national stage of PCT/EP2021/055113, filed Mar. 2, 2021, an application claiming the benefit of German Application No. 102020106013.0 filed Mar. 5, 2020, the content of each of which is hereby incorporated by reference in its entirety.

The present invention relates to a method for producing a pole core, an electromagnetic actuator with improved properties having the features of claim 1, a pole core having the features of claim 10, and an electromagnetic actuator having a pole core having the features of claim 12, and a vibration damper having such an electromagnetic actuator with the features of claim 13.

Pole cores are already known from the prior art in different configurations and are produced from a magnetic material, in particular ferromagnetic metal. Such pole cores are widely used in electromagnetic actuators for guiding a magnetic flux, which are used, for example, in damper valves for controlling the damper characteristics of a vibration damper. Between an inlet and an outlet, damper valves have an outlet opening that can be closed more or less. By opening or closing the outlet opening is throttled and thus the damping performance of a vibration damper is set. If the vehicle is to have a "hard" chassis, the throttle effect is increased or the outlet opening is closed more, while the outlet opening is opened further with a "soft" chassis. The damper valve is opened and closed by an electromagnetic actuator system, which closes a valve body when an excitation coil is energized accordingly.

Damping valves should be designed to "fail-safe" so that, for example, if the electromagnetic actuator fails, the motor vehicle can be operated safely with such a vibration damper.

In the prior art, various types of pole cores have been proposed for this purpose, the pole core being a flux-carrying component on the one hand and sealing off components of the electromagnetic actuator from the medium in the vibration damper on the other. This seal is necessary to prevent contaminants from penetrating into the components of the electromagnetic actuator and possibly interfering with the function of the electromagnetic actuator or vibration damper.

In the past, a pole core with a flange was proposed for this purpose, which is divided into a first section and a second section by a gap. A non-magnetic insert is placed in the gap bonding the first section to the second section. The insert is integrally bonded to both the first section and the second section, typically by brazing, and seals the gap. A pole core configured in this way is gas- and liquid-tight and has proven itself in the past. However, it has been shown that the integrally bonding between the first section, the insert and the second section is subject to wear due to internal stresses and different coefficients of thermal expansion and the tightness of the gap is not permanently guaranteed, which can lead to early failure of the electromagnetic actuator or of the damper valve as well as possibly the vibration damper.

This is where the present invention comes in.

It is the object of the present invention to propose an improved method for producing a pole core, a pole core, an improved electromagnetic actuator, and an improved vibration damper which expediently eliminates the disadvantages known from the prior art and enables the production of a long-term stable pole core taking into consideration economic aspects.

These objects are achieved by a method for producing a pole core with the features of claim 1, a pole core with the features of claim 10, an electromagnetic actuator with the features of claim 12, and a vibration damper with the features of claim 13.

Further advantageous configurations of the present inventions are specified in the dependent claims.

According to the invention, the method for producing a pole core with the features of claim 1 comprises the following method steps:
  providing a magnetic workpiece which has a first side and a second side, the first side having a groove directed towards the second side,
  inserting at least two inserts and at least one bonding means into the groove, the at least one bonding means being arranged between two inserts, and
  integrally bonding the at least two inserts to each other and/or the at least two inserts to the workpiece by preferred melting of the bonding means.

According to the invention, the method for producing a pole core is based on the finding that, when the bonding means is melted, capillary forces distribute the melted bonding means on the contact areas between the workpiece and the inserts, and the contact areas are completely wetted, bringing about intermetallic bonding between the inserts and the workpiece. The at least two inserts inserted into the groove partially compensate for material stresses caused by the distribution of the force vectors, and a pole core with a closed and integral bonding can be provided, which eliminates the problems known from the prior art. It has also proven to be essential that the flow paths of the melted bonding means are reduced.

Here and in the following, in connection with this invention, a magnetic workpiece is to be understood as a workpiece that is made of a soft-magnetic material that can be easily magnetized in a magnetic field. Such a material is, for example, carbon steel, iron or so-called soft iron, steel with added silicon, a nickel-iron alloy, a nickel-cobalt alloy or similar.

Furthermore, a preferred development of the production method provides that the at least two inserts are made of a non-magnetic material, in particular made of high-grade steel or stainless steel.

It has also been shown to be advantageous when carrying out the production method that the at least one bonding means comprises at least one isolated copper body which is inserted into the groove. Copper is excellently suited for producing an integral bond in the form of a closed soldered bond and, due to its material properties, has a high degree of elasticity, which means that stresses due to different thermal expansions of the inserts and the workpiece can be compensated for. Furthermore, copper has a low viscosity in the molten state, which is why the melt of the bonding means completely wets the inserts in the groove due to capillary forces and, after cooling, enables a resilient, brazed and integral bond. The at least one isolated copper body can preferably be a copper body adapted to the shape of the groove. For example, the copper body can be a copper wire, a molded part or bulk material. The copper body can also be formed from a copper alloy. Alternatively, instead of copper as the bonding means, another non-magnetic bonding means can be used that contains silver, brass, or similar, and that is suitable for brazing. By definition, brazing takes place in a temperature range above 723 K.

A development of the production method provides that the groove is machined into the first side of the workpiece by a machining manufacturing method, with the groove preferably being formed in the first side as an annular groove with a U-shaped cross section, having an inner side, a bottom side and an outer side. The respective insert is cuboid in cross section and can be adapted to the shape of the groove. The insert has a first area and a second area. If the groove is an annular groove, the respective insert can also be annular, with the first area corresponding to an inner lateral area and the second area to an outer lateral area.

According to a further preferred embodiment of the production method, the first area and/or the second area of at least one of the two inserts is designed as a transition fit, which is why the respective insert can be pressed into the groove with a moderate pressing force. It can be advantageous in this case if the insert has a transition fit only on the first side or on the second side, while a clearance fit can be provided on the other side, which takes into account the different thermal expansion of the materials used for the workpiece and the inserts. When the required temperature is reached, the bonding means melts and can flow a capillary gaps of approximately the same size both on the first side and on the second side. Due to capillary forces, the melt flows and is distributed therein.

As provided by a further advantageous embodiment of the present production method, the workpiece is positioned during integrally bonding in such a way that at least one of the inserts is pressed into the groove by gravity. As soon as the bonding means has liquefied when the melting temperature is reached, at least one of the inserts can exert a compressive force on the liquefied bonding means due to gravity and displace the liquefied bonding means between the at least two inserts in order to promote the distribution of the melted bonding means on the contact areas in the capillary gaps. In this case, the corresponding insert sinks, preferably so far that the at least two inserts in the groove—apart from a thin layer of the melted bonding agent—abut against each other. When the workpiece cools down, the bonding means cures and forms a closed integral bond both between the workpiece and the inserts and preferably also between the at least two inserts.

According to a preferred development of the production method, heating the workpiece and liquefying the bonding means takes place until the bonding means is almost completely displaced by capillary transport in the groove between the inserts, and the two inserts abut against each other in the groove. Excess melt of the bonding means can either escape from the groove or settle in a recess in the bottom side. An approximately constant thickness of the bonding means after cooling both in the capillary gaps and between the inserts prevents blowholes or cavities from forming, which on the one hand could impair the tightness of the integral bond and on the other hand promote internal stresses.

A development of the production method provides that after the workpiece has cooled down, material is removed from the first side and/or from the second side. In particular, it is preferred if after the cooling of the workpiece, the first side and/or the second side are/is reworked by means of a machining manufacturing method, such as lathing, milling or grinding.

Material is preferably removed at least in regions from the second side in order to expose an end face of one of the at least two inserts—or the bottom side of the groove—on the second side, whereby the magnetic workpiece is divided into a first section and a second section. After material has been at least partially removed from the second side and at least one of the inserts has been exposed, the groove forms a gap between the first section and the second section, the first section and the second section being integrally bonded in the gap by means of the at least two inserts and the bonding means.

A further aspect of the present invention relates to a pole core produced using the production method according to the invention. The pole core is preferably divided into at least two sections by a gap, with at least two non-magnetic inserts being arranged in the gap, via which the at least two sections are bonded by an integral bond.

Furthermore, it is preferred that the at least two non-magnetic inserts are made of stainless steel or high-grade steel and are bonded by means of a brazed integral bond, with copper being able to serve as the bonding means. The gap is sealed gas-tight and liquid-tight by the inserts and the integral bond, which means that no substance transport through the gap can take place from the first side to the second side, or vice versa.

A further aspect of the present invention relates to an electromagnetic actuator with such a pole core.

A third aspect of the present invention relates to a vibration damper with such an electromagnetic actuator.

A fourth and final aspect of the present invention relates to a motor vehicle with at least one such vibration damper.

Figure 2:
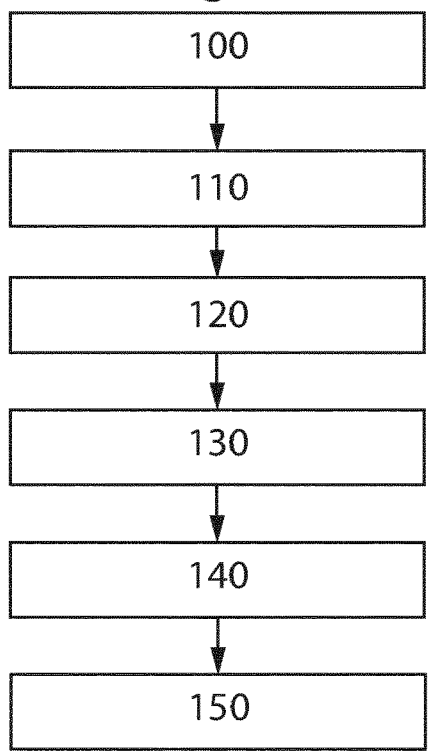

An exemplary embodiment of a pole core according to the invention is described in detail with reference to the accompanying drawings, in which FIG. 1 shows a sectional representation of a workpiece with a groove into which two inserts are pressed and which are bonded to the workpiece by means of a brazed integral bond in the groove, and FIG. 2 shows a schematic representation of the method for producing a pole core. Identical or functionally identical components are identified below with the same reference numerals. For the sake of clarity, not all identical or functionally identical parts are given a reference numeral in the individual figures.

FIG. 1 shows a workpiece 10 which is designed to be approximately rotationally symmetrical about a longitudinal axis X-X. Workpiece 10 has a sleeve section and a flange section, the flange projecting perpendicularly from the longitudinal axis X-X from the sleeve section.

The flange section has a first side 11 and a second side 12 spaced along the longitudinal axis X-X on opposite sides of the flange section.

A groove 15 with a U-shaped cross-section is arranged annularly about the longitudinal axis X-X, preferably in a rotationally symmetrical manner, in the flange section of first side 11 and directed towards the second side. Groove 15 has an inner side 15a, a bottom side 15b and an outer side 15c, inner side 15a and outer side 15c being arranged parallel to the longitudinal axis X-X. Bottom side 15b can be arched in the direction of the second side 12 and can have a cone or spherical countersink.

It can also be seen from FIG. 1 that two inserts 20 are inserted or pressed into groove 15. Each insert 20 is made of a non-magnetic material such as stainless steel. The respective insert 20 is ring-shaped and has two end faces 20b, a first area 20a formed by an inner lateral area and a second area 20c formed by an outer lateral area.

The respective insert 20 can be inserted into groove 15 coaxially to longitudinal axis X-X, with first area 20a and second area 20c of insert 20 being adapted to inner side 15a and outer side 15c. Inner side 15a of groove 15 and first area 20a of the respective insert 20 may be designed as a transition fit and their dimensions may be within a tolerance band of ±0.05 mm, more preferably ±0.025 mm, and particularly more preferably ±0.015 mm. Outer side 15c of groove 15 and second area 20c of respective insert 20 may also be designed as a transition fit and the dimensions thereof may be within a tolerance range of ±0.025 mm, more preferably ±0.015 mm.

FIG. 1 shows that a further pole core section 40 made from a magnetic material may be bonded to workpiece 10. Pole core section 40 is bonded to workpiece 10 via a non-magnetic sleeve 30, preferably made of stainless steel, wherein non-magnetic sleeve 30 may also be bonded to bonding means 25 by a brazed integral bond. Workpiece 10 can preferably have a cone-shaped bevel 35 on the side facing sleeve 30.

In groove 15, the two inserts 20 are integrally bonded to the workpiece, the integral bond being established by brazing with a bonding means 25 at temperatures above 723 K, which, according to a preferred embodiment of the production method described in detail later, contains copper.

For this purpose, workpiece 10 made of a magnetic material with first side 11 and second side 12 is first provided in a method step 100 according to FIG. 2.

Then, in method step 120, groove 15 is incorporated into workpiece 10 on the first side 11—preferably by lathing or milling.

In a subsequent method step 130, at least two inserts 20 and bonding means 25 are inserted into groove 15, bonding means 25 being arranged between the two inserts 20, preferably as at least one isolated body. In this state, insert 20 last inserted or pressed into groove 15 can protrude from groove 15 in some areas.

In a subsequent method step 140, the arrangement formed in method step 130 is heated until the bonding means melts for integrally bonding inserts 20 to workpiece 10 and inserts 20 to one another.

If copper is used as bonding means 25, the arrangement is heated to at least the melting temperature of copper, which is approx. 1358 K. The copper liquefies and flows due to capillary forces around inserts 20 in groove 15, particularly in capillary gaps between the inner side 15a and the first side 20a and between the outer side 15c and the second side 20c.

When heating the arrangement formed in method step 130, it is advantageous if the workpiece 10 is arranged such that the groove 15 is arranged in the vertical direction so that the inserts 20 are pressed into the groove 15 by gravity. Accordingly, workpiece 10 shown in FIG. 1 is to be arranged in such a way that the longitudinal axis X-X is aligned vertically and groove 15 points upwards with respect to the ground.

The arrangement from method step 130 is heated to a temperature above the melting temperature of bonding means 25 until bonding means 25 between the two inserts 20 has completely melted and the two inserts 20 abut against each other with the exception of a remaining film layer of bonding means 25. A pressing force can also press the two inserts 20 into groove 15 in the heated state of the arrangement.

After cooling, both first side 11 and second side 12 can be mechanically reworked. In order to form pole core 1 according to the invention, material is removed in method step 150 from second side 12 in order to expose groove 15 or insert 20 first inserted in groove 15 and to divide the workpiece into two areas 16, 18. The exposure of insert 20 is preferably done by milling or lathing, whereby workpiece 10 is divided in the two sections 16, 18 by a gap filled by groove 15 and inserts 20 integrally arranged in groove 15. The two sections 16, 18 are bonded exclusively by non-magnetic material, namely two inserts 20 and bonding means 25.

LIST OF REFERENCE NUMERALS 1 pole core
10 workpiece
11 first side
12 second side
15 groove
15a inner side
15b bottom side
15c outer side
16 sections
17 gap
18 section
20 insert
20a first area of 20
20b end face of 20
20c second area of 20
25 bonding means
30 sleeve
35 bevel
40 pole core section
X-X longitudinal axis

The invention claimed is:

1. A method for producing a pole core (1), comprising the following method steps:
   providing a magnetic workpiece (10), which has a first side (11) and a second side (12), the first side (11) having a groove (15) directed toward the second side (12),
   inserting at least two inserts (20) and at least one bonding means (25) into the groove (15), the at least one bonding means (25) being arranged between the two inserts (20), and
   integrally bonding the at least two inserts (20) to each other and/or the at least two inserts (20) to the workpiece (10).

2. The method according to claim 1,
characterized in that
said integrally bonding of the at least two inserts (20) to each other and/or the at least two inserts (20) to the workpiece (10) is carried out by heating the workpiece and liquefying the bonding means (25).

3. The method according to claim 1,
characterized in that
the at least two inserts (20) are made of a non-magnetic material, in particular stainless steel.

4. The method according to claim 1, characterized in that the bonding means (25) comprises at least one isolated copper body which is inserted into the groove (15).

5. The method according to claim 1, characterized in that at least one of the two inserts (20) has a transition fit (23) on a first area (21) and/or on a second area (22) which is adapted to the groove (15).

6. The method according to claim 1, characterized in that at least one of the two inserts (20) is inserted by being pressed into the groove (15).

7. The method according to claim 1, characterized in that the workpiece (10) is positioned during integrally bonding in such a way that at least one of the two inserts (20) is pressed into the groove (15) by gravity.

8. The method according to claim 1, characterized in that heating the workpiece and liquefying the bonding means (25) is carried out until the bonding means has flown by capillary transport in the groove (15) between the inserts (20) and the at least two inserts (20) approximately abut against each other in the groove (15).

9. The method according to claim 1, characterized in that material is removed from the second side to expose the at least one of the two inserts (20), preferably by a machining manufacturing method.

10. A pole core (1) produced with a production method according to claim 1.

11. The pole core according to claim 10, characterized in that a gap (17) divides the pole core (1) into at least two sections (16, 18), and that in the gap (17) the at least two non-magnetic inserts (20) are arranged, via which the at least two sections (16, 18) are bonded to each other.

12. An electromagnetic actuator with a pole core (1) according to claim 10.

13. A vibration damper for a vehicle with an electromagnetic actuator according to claim 12.

14. A vehicle with a vibration damper according to claim 13.

* * * * *

UNITED STATES PATENT AND TRADEMARK OFFICE
CERTIFICATE OF CORRECTION

| | | |
|---|---|---|
| PATENT NO. | : 12,176,769 B2 | Page 1 of 1 |
| APPLICATION NO. | : 17/909140 | |
| DATED | : December 24, 2024 | |
| INVENTOR(S) | : Aleš Buchta | |

It is certified that error appears in the above-identified patent and that said Letters Patent is hereby corrected as shown below:

On the Title Page

Item (72) Inventor, please remove the Inventor City "Kralicena Hané (CZ)" and replace with "Kralice na Hané (CZ)".

Signed and Sealed this
Eighteenth Day of February, 2025

Coke Morgan Stewart
*Acting Director of the United States Patent and Trademark Office*